F. A. COLEMAN AND J. J. HOFFMANN.
SEPARATOR PLATE FOR STORAGE BATTERIES.
APPLICATION FILED MAR. 12, 1921.
1,394,279.
Patented Oct. 18, 1921.
2 SHEETS—SHEET 1.
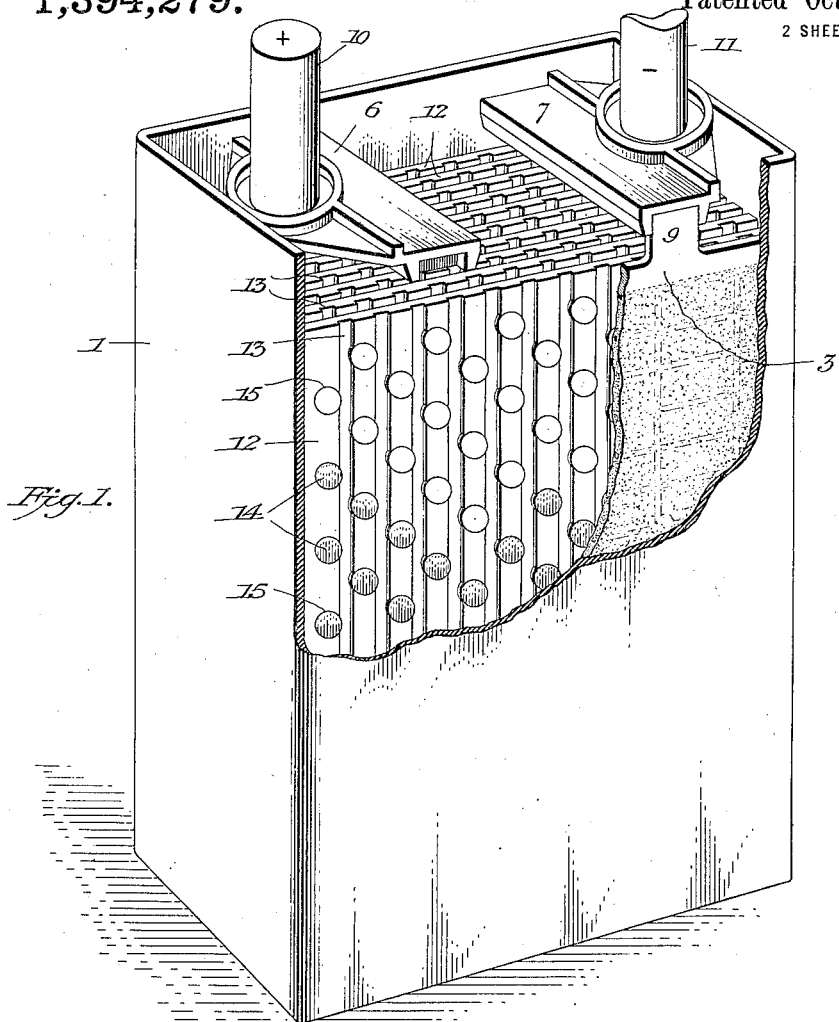
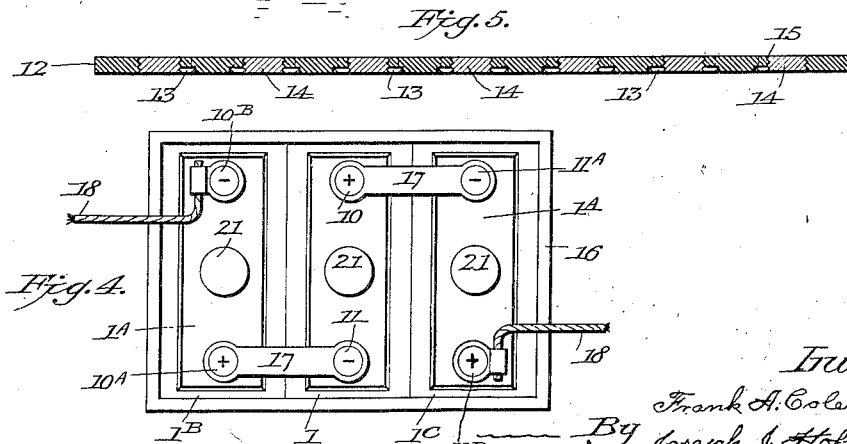

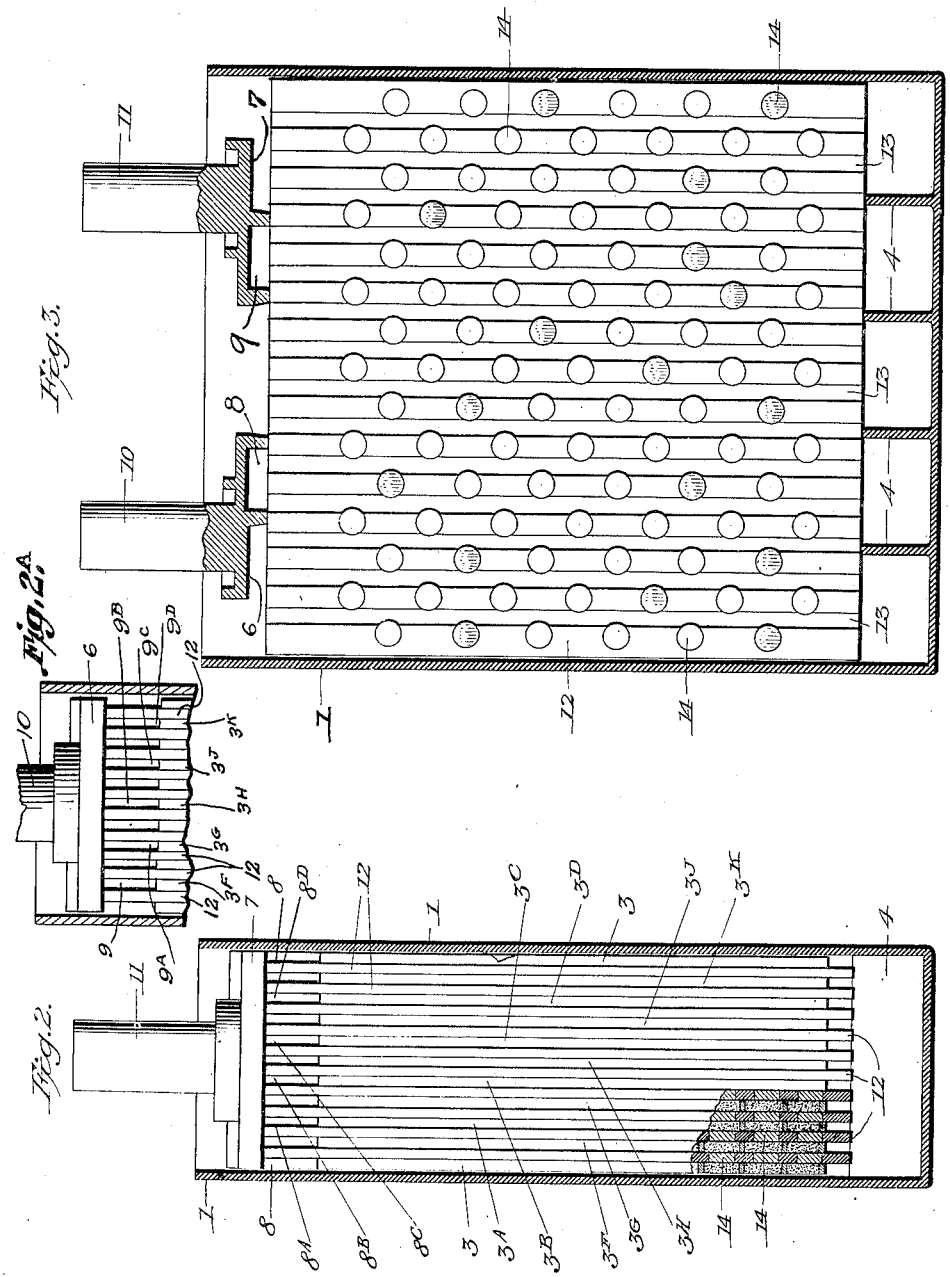

UNITED STATES PATENT OFFICE.

FRANK A. COLEMAN AND JOSEPH J. HOFFMANN, OF DENVER, COLORADO.

SEPARATOR-PLATE FOR STORAGE BATTERIES.

1,394,279.   Specification of Letters Patent.   Patented Oct. 18, 1921.

Application filed March 12, 1921. Serial No. 451,923.

*To all whom it may concern:*

Be it known that we, FRANK A. COLEMAN and JOSEPH J. HOFFMANN, citizens of the United States of America, residing at the city and county of Denver and State of Colorado, have invented a new and useful Separator-Plate for Storage Batteries, of which the following is a specification.

Our invention relates to a new and improved type of non-conductive and non-short-circuiting spacing plates for electric storage batteries.

And the objects of our invention are:

First. To provide an operative battery for storing electricity, in which the current storing plates are separated from each other by non-conductive and non-short-circuiting spacing plates, around and through which the electrolytic fluid circulates in contact with the storing plates.

Second. To provide an electric storage battery, in which non-conducting plates are used that permit of a free circulating of the electrolytic fluid from the negative plates to the positive plates, without danger of the spacing plates breaking down or buckling or otherwise becoming so disarranged as to allow the storing plates to come in contact with each other, and thus short circuit them.

Third. To provide a simple, strong and tough spacing plate that is provided with numerous electrolytic fluid penetrating parts that permit the electrolytic fluid to flow easily through it, to the negative and positive plates on its opposite sides.

We attain these objects by the mechanism illustrated in the accompanying drawings, in which:

Figure 1 is a perspective view—partly broken away—of a battery cell showing one of the improved separators which lie between the positive and negative plates.

Fig. 2 is a transverse, vertical, sectional view of an ordinary battery cell, showing the improved separators in position between the positive and negative plates, which are arranged in the usual manner.

Fig. 3 is a longitudinal, vertical, sectional view through the cell shown in Fig. 2.

Fig. 4 is a plan view, showing a three cell battery, the cells being connected in the usual manner. And Fig. 5 is a horizontal, sectional view of one of the separators.

Similar letters of reference refer to similar parts throughout the several views.

Referring to the drawings:

The numeral 1, designates the cell portion of our battery. We preferably make this cell of rubber, but it may be made of any other suitable material, and it is of a rectangular shape, and has an open top, into which the electric absorbing plates are placed, and the inside of the bottom of the cell is provided with upwardly projecting blades 4, of preferably about five-eighths of an inch in height, on the top edge of which the bottoms of some of the plates rest, which arrangement leaves a clear space between the bottom of the plates and the bottom of the cell between the blades. This cell is provided with a cover $1^A$, that fits tightly over it and is secured to it by rubber cement, which forms a liquid tight joint between the cover and the open top of the cell.

Within the cell 1, we place a group of plates that consists of twenty-one plates, as illustrated, although our invention contemplates the use of any number of plates; and this group of plates consists of two kinds of plates made of different kinds of materials placed in alternate relation to each other.

The two outside plates 3, and 3, and also each of the alternately positioned plates $3^F$, $3^E$, $3^G$, $3^B$, $3^H$, $3^C$, $3^J$, $3^D$ and $3^K$, in the group are called grid-plates, and they are adapted to receive and retain and to discharge electricity when operatively connected in circuit with other suitable elements, and they are composed of lead or zinc or any other suitable material, or they may be composed of a composition of different materials, as our invention contemplates the use of grid-plates made of or composed of any suitable material or metal or combination of metals or materials.

All of the grid-plates, of which there are eleven illustrated, are connected at their upper ends to bridge blocks 6 and 7, by lug members 8 and 9, which may be formed either on the upper edges of the grid-plates or on the underside of the bridge blocks, and they are either soldered or burned or otherwise connected to each other. The bridge block 7 is secured by lugs 8, $8^A$, $8^B$, $8^C$ and $8^D$, to grid-plates 3, 3, $3^E$, $3^C$, $3^D$ and $3^A$, and the bridge block 6, is secured by lugs 9, $9^A$, $9^B$, $9^C$ and $9^D$ to grid-plates $3^F$, $3^G$, $3^H$, $3^J$ and $3^K$. The bridge blocks straddle all of the plates in the group at sufficient distance above them to clear their upper edges, and they are placed at a short distance apart and adjacent to the opposite ends of the grid-plates, and they are preferably composed of lead or zinc, but may be made of any suitable metal or conductive material, and they are provided with vertically projecting posts 10 and 11, that are preferably positioned at their central portions, and they extend up through the cover $1^A$, of the cell 1, and they form the terminal contact poles of our battery.

These grid-plates are preferably about 6 inches square and about from an eighth to three-sixteenths of an inch thick, and they are also about that distance apart, as illustrated, and they are made larger or smaller for different sizes of batteries, and between each pair of them we place in alternate order, non-conductive spacing plates 12, of which there are ten illustrated, in the group of twenty-one plates, which are made to fit snugly in the cell 1.

These non-conductive spacing plates 12, are preferably made of rubber, but they may be made of any other suitable material or materials, or combinations of materials, and they are of the same width as the grid-plates, but are a trifle longer so that their lower edges rest on top of the blades 4, in the bottom of the cell 1, while their upper edges extend a trifle above the upper edges of the grid-plates, and the under sides of the bridge blocks rest on top of them. Consequently, as the grid-plates are a little shorter than the non-conductive spacing plates, they do not extend to, and consequently do not rest on the upwardly projecting blades in the bottom of the cell 1, but they simply depend freely from the bridge blocks down between the non-conductive rubber plates 12. The two bridge blocks hold all of the depending grid-plates in a substantially firm and quite rigid depending position relative to each other and at equidistances apart, and the non-conductive spacing plates are of a thickness to fit tightly between them, and the outside grid-plates 3 and 3, and the group of plates fit snugly inside of and against the sides of the cell. Consequently, all of the conductive grid-plates, with the non-conductive spacing plates, fit very closely and flatly together, and are held under slight pressure together by the bridge blocks and their lugs and the sides of the cell.

These rubber plates are provided on one of their sides with narrow vertically positioned recessed grooves, 13, that extend throughout their whole length, which are of shallow depth, but are of a sufficient depth to allow the electrolytic liquid to flow and circulate through them, and they are preferably placed quite close together throughout the side surface of these non-conductive plates, those illustrated being about five-sixteenths inches apart for the size of non-conductive plate shown.

We provide each of these ten rubber non-conductive plates with a large number of small pieces of a non-conductive substance of any suitable kind, that will allow the electrolytic fluid to penetrate or seep readily through it. Our invention contemplates the use of any suitable material for this purpose, but we preferably use wood; we preferably make the small pieces of wood in the form of small disks 14, and we secure them in holes 15, that are drilled or otherwise formed through the plates in vertical rows. We preferably space the electrolytic fluid circulating grooves of these plates at such a distance apart that the opposite sides of each hole in each vertical row of holes will extend into the path of and intersect the two grooves on their opposite sides in order that the electrolytic fluid, as at circulates up and down in the cell and in the grooves of these plates, will come directly in contact with the wooden disks and thus more readily seep into and flow slowly through them, as these wooden disks which we preferably make of oak, are porous and the fluid readily works into and through them.

The acid or other electrolytic fluid with which the cell 1, is filled, cannot get to the opposite side surfaces of any of the grid-plates that are between the two outside grid-plates 3, and cannot get to their inside surfaces except it rises up into the recessed grooves of these non-conductive spacing plates 12, and then it contacts only with that side of the grid-plates the recessed grooves engage, and in order for the electrolytic fluid to come in contact with the grid-plates on the opposite sides of these non-conductive spacing plates, it has to work into and through the wooden disks 14, which it does, and as there is a large number of these disks, they convey an ample supply of the electrolytic fluid to the sides of the grid-plates that are on the opposite sides of these non-conductive spacing plates from their recessed grooved sides.

Our invention contemplates any means for securing the wooden disks 14, in the holes of the non-conductive spacing plates against accidental displacement. We preferably, however, secure them in the holes by screwing them tightly into the holes. For this purpose we cut spiral threads of fine pitch, by means of a threading tap, into the circular wall of each of the holes 15, in the rubber plates, and then forcibly screw round pieces of oak or other wood into and through them, and then cut the disks off flush with the opposite sides of the plate. Then when these plates are immersed in the electrolytic fluid, the wooden disks will swell and fit very tightly in their holes. These rubber plates are non-conductors of the electric current, and our invention contemplates the use of any non-conductive material as a spacing plate between the positive and negative poles of a battery.

We have illustrated and described one cell and its storing and discharging plates mechanism arranged in operative relation to each other, and we form batteries of one, two, three, or any number of cells, and in Fig. 4 we illustrate a battery of three cells, 1, $1^B$ and $1^C$, operatively connected together and incased in a wooden box 16. These three cells are connected together in the following manner: The cells are placed close together and fit snugly in their inclosing box, and the two upwardly projecting posts 10 and 11, of the center cell 1, are connected by two electric current conveying straps 17, to the terminal circuit posts $10^A$ and $11^A$, of the outside cells $1^B$ and $1^C$, which binds all three cells together. The straps 17, may be connected to the posts in any way desired, but we preferably provide their opposite ends with holes that fit down over the posts, which are made slightly tapering; consequently, when the straps are pressed down on the posts, they draw the cells tightly together.

The terminal contact post $10^B$, is the negative pole, and $11^B$, is the positive pole of the outside cells, $1^B$ and $1^B$, and to these poles circuit wire, terminals 18, are connected, from which suitable circuit wires can be extended when the battery is used on automobiles, for which it is especially designed, to the generator, the starter, the electric lamps and to ground. We do not illustrate these several above mentioned parts and connections, as they do not form a part of our present invention, as the battery can be charged from a charging station and the current used for numerous purposes. The cover $1^A$, of each of the cells is provided with a screw capped aperture 21, through which the cell may be filled with any suitable acid or electrolytic fluid, and these covers are cemented by rubber cement to the top of the cells, both along their edges where it joins the top of the cell, and along the edges between the three cells, which seals the cell and makes it water and air tight. Cement is also placed around the bases of the terminal posts.

The operation of the battery and of our non-conductive spacing plates under the action of the electrolytic fluid and between the positive and negative grid-plates, is as follows:

The grid-plates $3^F$, $3^G$, $3^H$, $3^J$ and $3^K$, are positive plates, and the grid-plates 3, and 3, also $3^B$, $3^C$, $3^D$ and $3^A$, are negative plates, and the electrolytic fluid may be any suitable fluid in common use.

The bridge block 6, is connected to the positive plates, and its vertical post is the positive pole of the cell 1, and the bridge block 7, is connected to the negative plates and its vertical post is the negative pole of the cell 1. Our non-conductive and non-short-circuiting spacing plates are placed between each pair of negative and positive plates, and their vertical recessed grooves allow the electrolytic fluid to circulate freely between the side of our spacing plate they are on and the grid-plate the grooved side of each spacing plate bears on, while the very numerous wooden disks throughout the area of the side surface of each disk allow a large amount and a sufficient amount of the electrolytic fluid to flow through them against the surface of the grid-plates on its opposite perfectly flat smooth side, which is preferably not provided with grooves. Consequently the grid-plates on each side of all of our spacing plates are amply provided with the electrolytic fluid.

Our invention provides a reliable and practical non-conductive and non-short-circuiting spacing plate for the negative and positive plates of electric storage batteries, that enables the storage battery to be recharged in about one-half of the time that is required to charge the batteries at present in use, and they will store more electric energy, and consequently they will last longer than most of the batteries in use.

Having described our invention, what we claim as new and desire to secure by Letters Patent, is:

1. A spacing plate for battery plates, comprising a rubber plate provided with closely arranged recessed grooves in one of its surfaces, and provided with a multiudinous number of wooden disks extending through it, and means for securing said wooden disks in said rubber plate.

2. A spacing plate for the plates of storage batteries, comprising a spacing plate between each pair of battery plates, of non-conductive material, provided with numerous grooves on one of its sides, and numerous wooden disks secured to and extending through it.

3. A spacing plate for battery plates, comprising a rubber plate provided with closely arranged recessed grooves in one of its surfaces, and provided with a multitudinous number of wooden disks extending through it, and means for securing said wooden disks in said rubber plate, the opposite edges of said wooden disks being arranged to intersect the grooves on one of its sides.

4. A spacing plate for the plates of storage batteries, comprising a spacing plate between each pair of battery plates, of non-conductive material, provided with numerous grooves on one of its sides, said plates being provided with numerous threaded apertures extending through it, the edges of which intersect the edges of the grooves in one side of said plates, and wooden disks threaded into and through said threaded apertures in said plate.

5. In a storage battery, the combination with the positive and negative plates, of separators interposed between said plates, each comprising a suitable non-porous and acid resisting plate having rows of holes, spaced vertical grooves on one side of said plate, which are adapted to intersect opposite sides of the holes in the several rows, and wooden plugs in said holes.

6. In a storage battery, the combination with the positive and negative plates, of separators interposed between said plates, each of which comprises a non-porous and acid resisting plate having rows of threaded holes, vertical grooves on one side of said plate, each of which lies between two vertical rows of holes, and intersects the adjacent sides of said holes, and threaded wooden plugs in said holes, which are flush with the faces of the plate.

In testimony whereof we affix our signatures in presence of two witnesses.

FRANK A. COLEMAN.
JOSEPH J. HOFFMANN.

Witnesses:
G. SARGENT ELLIOTT,
ELIZABETH SMITH.